United States Patent
Carvalho et al.

(10) Patent No.: US 10,656,922 B2
(45) Date of Patent: May 19, 2020

(54) SYSTEMS AND METHODS FOR PROVIDING AN APPLICATION TRANSFORMATION TOOL

(71) Applicant: PAYPAL, INC., San Jose, CA (US)

(72) Inventors: Fabio Silva Carvalho, Austin, TX (US); Santosh Jaipal Daryani, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 15/990,158

(22) Filed: May 25, 2018

(65) Prior Publication Data

US 2019/0361684 A1 Nov. 28, 2019

(51) Int. Cl.
*G06F 8/40* (2018.01)
*G06F 8/65* (2018.01)
*G06F 8/658* (2018.01)
*G06F 11/36* (2006.01)
*G06F 8/41* (2018.01)

(52) U.S. Cl.
CPC ............ *G06F 8/40* (2013.01); *G06F 8/41* (2013.01); *G06F 8/65* (2013.01); *G06F 8/658* (2018.02); *G06F 11/3688* (2013.01)

(58) Field of Classification Search
CPC ..... G06F 8/40; G06F 8/41; G06F 8/65; G06F 8/865; G06F 11/3688
See application file for complete search history.

(56) References Cited

U.S. PATENT DOCUMENTS

| | | | | |
|---|---|---|---|---|
| 6,968,541 B1* | 11/2005 | Hanson | ............... | G06F 8/41 717/106 |
| 8,191,060 B2* | 5/2012 | Malasky | ............... | G06F 8/61 717/175 |
| 8,443,335 B2* | 5/2013 | Bakshi | ............... | G06F 17/505 716/137 |
| 9,224,010 B2* | 12/2015 | Pawlowsky | ............... | G06F 21/64 |
| 9,594,548 B2* | 3/2017 | Pena | ............... | G06F 8/65 |
| 9,696,971 B1* | 7/2017 | Wierda | ............... | G06F 8/41 |
| 9,928,043 B2* | 3/2018 | Bacinschi | ............... | G06F 8/36 |
| 10,083,016 B1* | 9/2018 | Norman | ............... | G06F 16/211 |
| 10,318,285 B1* | 6/2019 | Jodoin | ............... | G06F 8/40 |
| 10,523,582 B2* | 12/2019 | Shear | ............... | H04L 63/10 |
| 2002/0038349 A1* | 3/2002 | Perla | ............... | G06F 11/3684 709/217 |
| 2004/0205571 A1* | 10/2004 | Adler | ............... | G06F 17/2247 715/236 |
| 2008/0127169 A1* | 5/2008 | Malasky | ............... | G06F 8/61 717/174 |

(Continued)

*Primary Examiner* — Ziaul A Chowdhury
(74) *Attorney, Agent, or Firm* — Haynes and Boone LLP

(57) ABSTRACT

Methods and systems for providing an application transformation tool are presented. The application transformation tool may include a transformation engine and a template repository that stores transformation templates. Each of the transformation templates may be associated with a type of transformation and may define a set of transformation operations. The transformation engine may provide a user interface for receiving a request to transform an application. Based on the request to transform an application, the transformation engine may select one or more transformation templates from the template repository and may transform the application based on the selected transformation template(s).

20 Claims, 8 Drawing Sheets

(56) References Cited

U.S. PATENT DOCUMENTS

| | | | | |
|---|---|---|---|---|
| 2010/0325202 | A1* | 12/2010 | Rehtijarvi | H04L 67/34 709/203 |
| 2011/0022603 | A1* | 1/2011 | Khader | G06F 8/65 707/748 |
| 2011/0296391 | A1* | 12/2011 | Gass | G06F 8/36 717/168 |
| 2014/0282371 | A1* | 9/2014 | Hirsch | G06F 8/36 717/106 |
| 2015/0020010 | A1* | 1/2015 | Hale | G06F 3/04842 715/765 |
| 2015/0095473 | A1* | 4/2015 | Goetsch | H04L 41/0886 709/222 |
| 2017/0168797 | A1* | 6/2017 | Pogrebinsky | G06F 8/65 |
| 2018/0101371 | A1* | 4/2018 | Flanakin | G06F 8/36 |
| 2018/0329700 | A1* | 11/2018 | Doshi | G06F 8/75 |
| 2018/0336027 | A1* | 11/2018 | Narayanan | G06F 8/61 |
| 2018/0349113 | A1* | 12/2018 | Boo | G06F 8/40 |
| 2019/0004774 | A1* | 1/2019 | Mount | G06F 8/41 |
| 2019/0095185 | A1* | 3/2019 | Zhang | H04L 67/02 |
| 2019/0171772 | A1* | 6/2019 | Anand | G06F 16/958 |

* cited by examiner

SYSTEMS AND METHODS FOR PROVIDING AN APPLICATION TRANSFORMATION TOOL

BACKGROUND

The present specification generally relates to transformation of applications, and more specifically, to providing a framework to facilitate transformation of applications according to various embodiments.

RELATED ART

Organizations such as enterprises usually need to manage a large number of software applications. For example, an electronic commerce website may include thousands of software applications for providing various front-end user interfaces and the back-end functionalities of the website. In order to facilitate development and management of such a large portfolio of software applications, an organization may develop an application framework (or adopt an application framework developed by a third-party) within which the software applications may execute. The application framework provides a structure and tools (e.g., security modules, user interface components, etc.) that may be utilized by the software applications such that the applications may be consistent (e.g., consistent look-and-feel, consistent security features, etc.) with each other.

However, when an organizational change is being implemented (e.g., an upgrade to an application framework, a migration from one application framework to another application framework, an update to a security module for applications, etc.), each software application may be required to be updated (transformed) to accommodate the organizational change. For each software application, it may take a software developer hours or sometimes even days to transform a software application to enable the application to be compatible with the new application framework and/or the new version of the application framework. Further, since the software applications are manually edited, the editing may not be consistent with each other and may cause bugs and errors within the software code. Thus, there is a need for providing a mechanism for transforming software applications in an efficient and consistent manner.

Figure 1A:
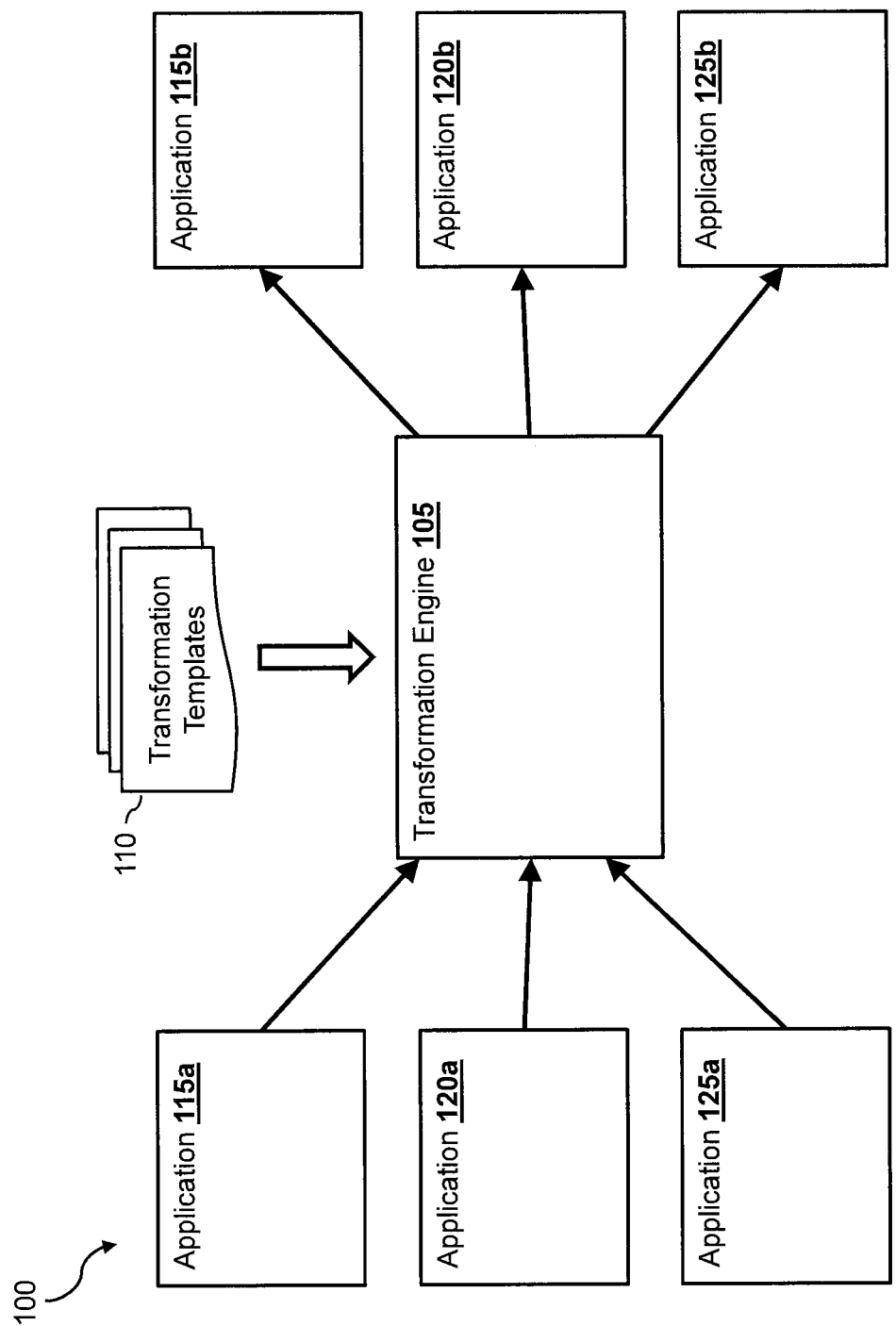
FIG. 1A is a block diagram illustrating a transformation engine according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing an application transformation tool for transforming software applications in a consistent and efficient manner. The application transformation tool may include a transformation engine and a template repository that stores transformation templates. Each of the transformation templates may be associated with a type of transformation and may define a set of transformation utilities (e.g., utility operations) and a set of transformation operations. The transformation engine may provide a user interface for receiving a request to transform an application. Based on the request to transform the application, the transformation engine may select one or more transformation templates from the template repository and may transform the application based on the selected transformation template(s).

Different transformation templates may be associated with different types of transformations. For example, one transformation template may be associated with migrating from a first application framework to a second application framework. Another transformation template may be associated with upgrading from a first version of an application framework to a second (subsequent) version of the application framework. Yet another transformation template may be associated with implementing a universal fix (e.g., a security fix) to the software applications. An application framework is a framework under which one or more software applications may be built and developed. An application framework may include common tools and capability that the software application may utilize or built on top of.

In some embodiments, the application transformation tool may provide a user interface that enables a user to specify a request to transform a software application. The request may specify a set of transformation criteria (e.g., a type of transformation desired by the user). For example, the request may specify a transformation to an application that is associated with upgrading from Version 1.0 of an application framework to Version 2.0 of the application framework. In another example, the request may specify a transformation to an application that is associated with migrating from one application framework to another application framework. Based on the type of transformation specified in the request, the transformation engine may select one or more transformation templates from the template repository. For example, the transformation engine may search through the template repository to identify a transformation template that is associated with upgrading from Version 1.0 of the application framework to Version 2.0 of the application framework, based on the request. When such a transformation template is identified, the transformation engine may select the transformation template to be applied to the application.

However, in some embodiments, when a single transformation template that satisfies the criteria specified in the request is not found, the transformation engine may search through the templates to determine if multiple transformation templates may, in combination, satisfy the criteria. For example, when no transformation template associated with upgrading from Version 1.0 of the application framework to Version 2.0 of the application framework exists in the template repository, the transformation engine may search in the repository for at least a first transformation template that is associated with upgrading from Version 1.0 of the application framework to an intermediate version (e.g., Version 1.2) of the application framework and a second transformation template that is associated with upgrading from an intermediate version (e.g., Version 1.2 or higher) of the application framework to Version 2.0 of the application framework, and select at least the first and second transformation templates to be applied to the application.

Similarly, in various embodiments, when the criteria specified in the request is associated with migrating from Application Framework 'A' to Application Framework 'B,' the transformation engine may select a transformation template that is associated with migrating from Application Framework 'A' to Application Framework 'B,' and if such a template is not found in the repository, the transformation engine may identify at least a transformation template that is associated with migrating from Application Framework 'A' to a third application framework (e.g., Application Framework 'C') and another transformation template that is associated with migrating from the third application framework to Application Framework 'B.' Instead of having only two transformation templates, the transformation engine may identify more than two transformation templates when there is more than one intermediate version or intermediate application framework.

Upon selecting the transformation template(s), the transformation engine may then transform the application based on the selected transformation template(s) to generate a transformed application. In some embodiments, the application may include a data structure (e.g., a file structure comprising multiple folders of files) that stores and organizes different data objects (e.g., data files) related to the application. The data objects may include objects that store source codes that may be compiled and executed to perform functionalities of the application. The data objects may also include configuration files that indicate to the application (or the compiler/execution program that executes the application) information (e.g., dependency information) of the application. The dependency information may specify, for example, which other application(s), data storage, and/or network on which the application depends during execution. In some embodiments, to transform the application based on a transformation template, the transformation engine may first apply the set of transformation utilities on the application to generate a context of the application. The context may include information regarding the file structure of the application (e.g., how many folders, a file location of the configuration file, a location of one or more source code files, etc.). Once generated, the context may be accessed by the set of transformation operations.

The transformation engine may selectively apply the sets of transformation operations associated with the selected transformation template(s) to the application to generate a transformed application based on the generated context. For example, the transformation template may instruct the transformation engine to perform a first subset of the transformation operations when the context indicates a first condition, and to perform a second subset of the transformation operations when the context indicates a second condition. Further, some of the transformation operations may be performed differently based on the context. For example, a transformation operation that modifies a configuration file of the application may be performed based on the detected location of the configuration file (from the context).

When more than one transformation templates are selected, the transformation engine may apply the transformation operations in sequence to the data structure to generate the modified application. The sets of transformation operations may include different operations that can be performed on the application. Example operations include adding and/or removing one or more folders in the data structure, changing a name of a folder in the data structure, modifying the configuration file (e.g., adding or removing a dependency, etc.), modifying one or more source code files (e.g., changing a function call name, changing the parameters in one or more function calls, etc.), and/or any other types of operations for modifying the application. Transforming the application according to the selected transformation template(s) may comprise performing each of the transformation operations associated with the selected transformation template(s) on the application. When multiple transformation templates are selected, the transformation engine may order the transformation templates such that the transformation operations are performed sequentially in the order of the progression (e.g., an upgrade path, a migration path, etc.) of the transformation (e.g., performing the operations associated with upgrading from Version 1.0 to Version 1.2 and then performing the operations associated with upgrading from Version 1.2 to 2.0).

In some embodiments, instead of applying the selected transformation templates to the application, the transformation tool may merge the selected transformation templates to generate a merged transformation template before applying the merged transformation template to the application. Merging the transformation template may provide additional improvement to the efficiency of the transformation by, for example, simplifying and/or eliminating at least some of the transformation operations. For example, the transformation tool may combine a transformation operation from a first template with a transformation operation from a second template to generate a single merged operation. In another example, the transformation tool may determine that a transformation of the first template becomes unnecessary in view of one or more operations in the second template, and thus remove the unneeded operation of the first template in the merged template, such as when the operation in the two templates perform the same operation or are otherwise duplicative or redundant.

In some embodiments, the transformation tool may analyze the application to determine a particular application framework and/or a particular version of the application framework that the application is currently compatible with, such that the user may only need to specify the intended application framework and/or the intended version of the application framework that the user desires the application to be compatible with, without specifying the current version and/or the current application framework that the application is compatible with.

The transformation templates stored in the repository may be obtained in different ways. For example, a transformation template may be generated by a human software developer. In these embodiments, the application transformation tool may provide an interface that enables the human software developer to generate and add a new transformation template in the repository. The interface may also enable the human software developer to associate the new template with a corresponding type of transformation (e.g., upgrade from Version 2.0 to Version 3.0 of an application framework).

In some embodiments, instead of obtaining a new transformation template from a human (or an external source), the transformation tool may automatically generate a new transformation template. It has been contemplated that when a new version of an application framework is developed, an upgrade specification (e.g., release notes) that indicates a difference between the new version and the previous version may be made available. As such, the transformation tool may generate the new transformation template based on the upgrade specification. In some embodiments, a transformation template includes compilable programming codes or interpretable programming codes.

In some embodiments, once a new transformation template is obtained, the new transformation template is validated before being added to the template repository. For example, the transformation tool may compile and execute the new transformation template to determine if the new transformation template passes a failure (error) threshold. The new transformation template may be added to the template repository only when it is determined that the new transformation template passes the failure threshold. Once the new transformation template is added to the repository, it is made available for selection by the transformation engine.

As discussed above, to transform an application based on a transformation template, the transformation engine may perform the transformation operations associated with the template on the application. In some embodiments, in addition to the transformation operations, the transformation template may also include test operations associated with the transformation operations. Each test operation may include compilable programming codes or interpretable programming codes for testing the application after the associated transformation operation(s) has been performed on the application. For example, when a transformation operation includes an operation to insert an additional parameter to a function call in a source code of the application, the corresponding test operation may include an operation to parse the source code to determine if the additional parameter was indeed inserted to the function call. As such, after the transformation engine has performed one or more of the transformation operations on the application, the transformation engine may also run the test operation associated with the one or more of the transformation operations to determine whether the application have been successfully modified based on the one or more of the transformation operations. The transformation engine may record whether the one or more of the transformation operations have been successfully performed on the application, and subsequently report the result to the user.

FIG. 1A illustrates an application transformation tool 100 according to various embodiments of the disclosure. The application transformation tool 100 includes a transformation engine 105 and one or more transformation templates 110. In some embodiments, the transformation engine 105 may use the one or more transformation templates 110 to efficiently and consistently transform different software applications. For example, several software applications (e.g., applications 115*a*, 120*a*, and 125*a*) may be developed to be executed within a first application framework (e.g., Application Framework 'A'). A decision was made to migrate the applications 115*a*, 120*a*, and 125 from Application Framework 'A' to a different application framework (or an upgraded version of the application framework) (e.g., Application Framework 'B'). For example, when an upgraded version of the application framework has been released with upgraded security features, an organization may decide to transform all of the applications developed within the organization to the upgraded version of the application framework. Application Framework 'B' may be different from Application Framework 'A' in one or more ways, such as a different dependency structure, different function names, and/or different parameters in the functions, etc., as will be described in more detail below by reference to FIG. 1B. Conventionally, each software application must be modified (e.g., transformed) manually (e.g., changing the dependency, modifying the source code, etc.), for example, by human software developers, such that they can be executed in the new application framework. As discussed above, manually editing the software applications may take tremendous resources away from the human software developers. Furthermore, manually editing the software applications separately can be error-prone, as some of the applications may not be transformed correctly to work with the new application framework.

As such, in some embodiments, instead of requiring the human software developers to manually edit the applications 115*a*, 120*a*, and 125*a*, one or more transformation templates associated with the requested transformation may be obtained. For example, one or more transformation templates that are associated with upgrading from Application Framework 'A' to Application Framework 'B' may be generated or obtained. The transformation engine 105 may then use the one or more transformation templates 110 to transform each of the applications 115*a*, 120*a*, and 125*a* to generate the transformed applications 115*b*, 120*b*, and 125*b*, respectively. By using the transformation templates 110 to transform the applications 115*a*, 120*a*, and 125*a*, the transformation engine 105 may advantageously provide consistent transformations across the applications 115*a*, 120*a*, and 125*a*, such that the applications 115*a*, 120*a*, and 125*a* go through identical transformation to be executed in the new application framework. Furthermore, the transformation engine 105 of some embodiments may even validate the one or more transformation templates 110 before applying to the applications 115*a*, 120*a*, and 125*a* to advantageously reduce errors in the transformations of the applications 115*a*, 120*a*, and 125*a*, as will be described in more detail below.

Figure 1B:
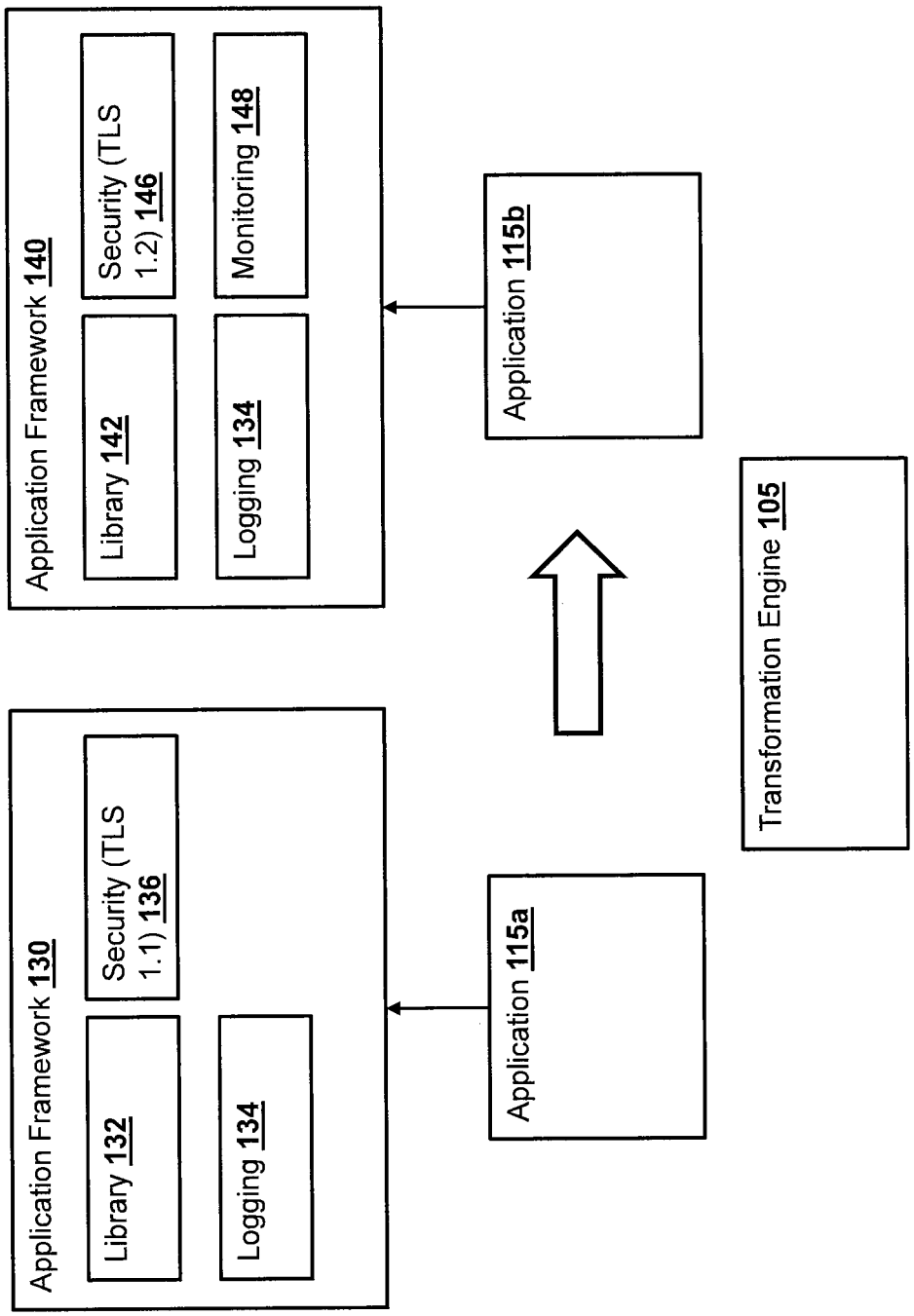
FIG. 1B illustrates transforming from one application framework to another application framework according to an embodiment of the present disclosure.

FIG. 1B illustrates an example of transforming an application from one application framework to another application framework. An application framework is a framework under which one or more software applications may be built and developed. An application framework may include common tools and capability that the software application may utilize or built on top of. Application framework 130 is an example of an application framework. In this example, the application framework 130 includes a software library 132, a logging module 134, and a security module 136. The software library 132 provides basic and/or common functionalities that different software applications may use. For example, the software library 132 may include different functions that may be accessed by applications developed under the application framework 130. Each of the function may provide an interface (e.g., an application programming interface) that may include a function name and a set of parameters. The logging module 134 may provide features that may be performed when the underlying application enables a user to log into a user account. The security module 136 may provide security features for the underlying application when the underlying application communicates with external applications over a network. The logging and security features may be performed for the underlying applications seamlessly (e.g., without requiring the underlying applications to make any function calls). In this example, the security module 136 provides security features according to the transport layer security version 1.1 standard.

As shown in FIG. 1B, the application 115a was initially built under application framework 130. A request may be made to transform the application from the application framework 130 to application framework 140. In some embodiments, the application framework 140 may be an upgraded version of the application framework 130. As shown, the application framework 140 also includes the same logging module 134. However, instead of software library 132, the application framework 140 may include a software library 142. The software library 142 may include functions that have different names and/or different parameters than the ones in the software library 132. As such, in order to utilize the same functionalities, the application 115a needs to be transformed to modify the function name and/or parameters in the function calls made in the source code of the application 115a.

The application framework 140 also includes a security module 146. However, the security module 146 is different from the security module 136 in that the security module 146 provides security features according to the transport layer security version 1.2 standard. As such, in order to utilize the security features in the application framework 140, the application 115a needs to be transformed to modify the configuration file to refer (or depend) on the transport layer security version 1.2 capabilities prescribed in the application framework 140.

Further, the application framework 140 also includes a new module—monitoring module 148 that provides functionalities not available in the application framework 130. By migrating to the application framework 140 (e.g., transforming from the application 115a to the application 115b), the application 115b may reap the benefits of the new features provided by the monitoring module 148.

Figure 2:
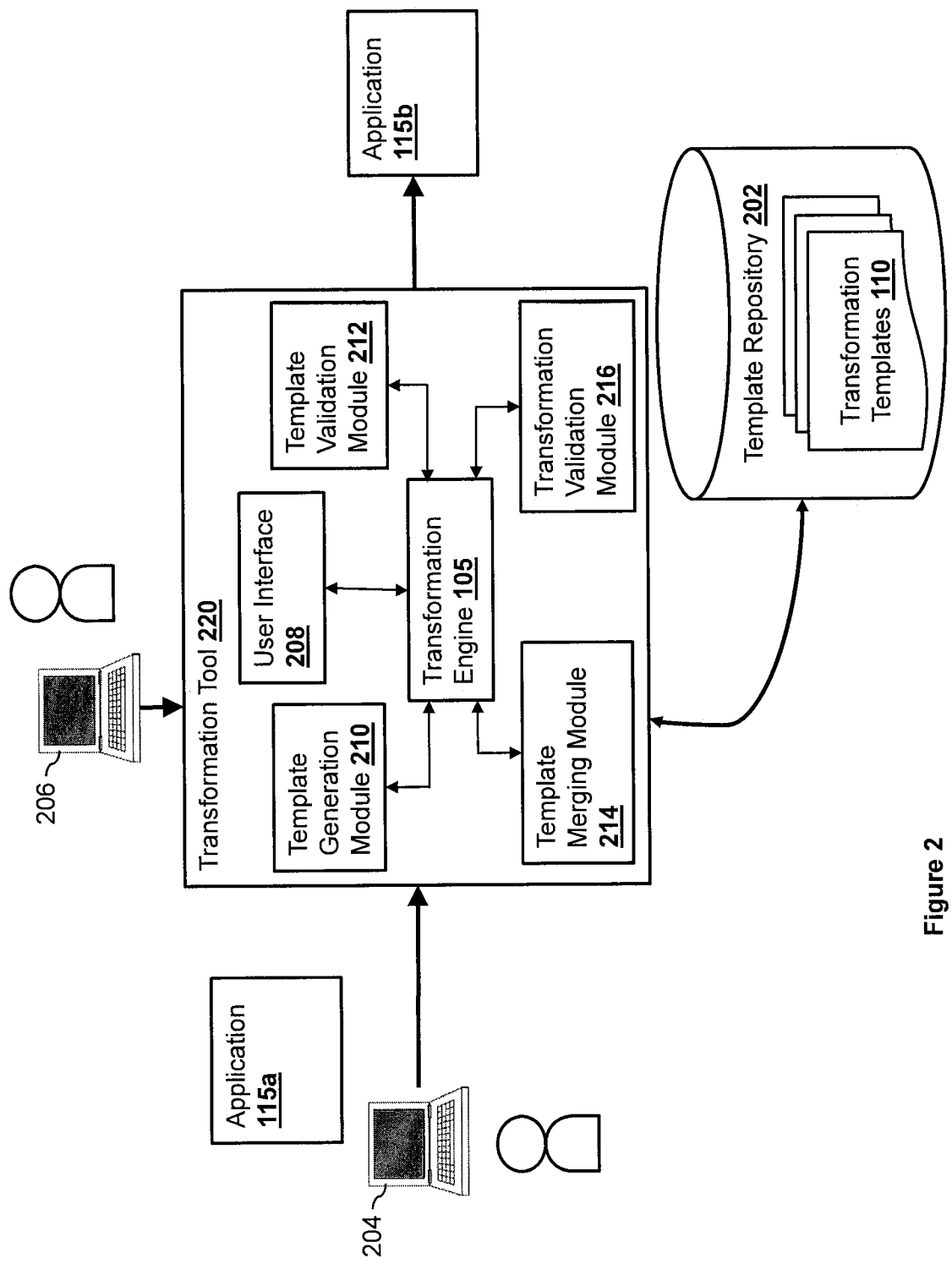
FIG. 2 is a block diagram illustrating an application transformation platform according to an embodiment of the present disclosure.

FIG. 2 illustrates a transformation tool according to various embodiments of the disclosure. As shown, a transformation engine 220 is communicatively coupled to a template repository 202, which stores one or more transformation templates (e.g., transformation templates 110). The transformation tool 220 includes the transformation engine 105, a user interface 208, a template generation module 210, a template validation module 212, a template merging module 214, and a transformation validation module 216. As shown, external devices such as computing devices 204 and 206 may interact with the transformation tool 220 via the user interface 208.

As discussed above, the transformation templates may be obtained in different ways. In some embodiments, one or more transformation templates may be received from one of the external devices (e.g., the computing device 206). A transformation template may be generated by a human software developer, for example, via an extension application programming interface (API) of the template generation module 210. For example, when it is desired that one or more applications (e.g., applications 115a, 120a, and 125a) be transformed according to a particular type of transformation (e.g., migrated/upgraded from a first application framework to a second application framework), the human software developer may generate a transformation template specifically for the particular type of transformation. The transformation tool 220 may provide an application programming interface (API) that the human software developer may use to provide the transformation template to the transformation engine 105 via the user interface 208. The API may also enable the human software developer to indicate to the transformation engine 105 the type of transformation associated with the transformation template.

In some embodiments, the second application framework may be a completely different application framework than the first application framework. For example, the second application framework may include different sets of capabilities, different interfaces for triggering a set of functions, etc. In other embodiments, the second application framework is an upgraded version of the first application framework. The transformation template may be generated, for example, based on the differences between the first and second application frameworks. Example differences between two application frameworks may include different dependency structures, different function calling conventions, different parameters for the functions, etc. As such, the generated transformation template may include transformation operations for modifying an application based on the differences. The transformation operations may include at least one of an operation for modifying the dependency of the application, an operation for modifying the name of a function call within the source code of the application, or an operation for modifying the parameters being included in a function call. Appendix A illustrates an example transformation template according to one embodiment of the disclosure. As shown in the example illustrated in Appendix A, a transformation template may include compilable programming code that once compiled may be executed by a processor, but may also include other types of programming code as well. In some embodiments, the transformation template may also include transformation utilities that do not modify the applications. The transformation utilities may be used to generate (or derive) a transformation context for the application. The transformation context provides the transformation engine the necessary context to perform the corresponding transformation operations associated with the transformation template. For example, the transformation utilities may include utilities such as detecting a number of folders/files in the file structure of the application, determining a location of a file based on a name, etc. As such, the generated context may indicate to the transformation engine the file structure of the application, locations of the different files (e.g., the configuration file, the source code files, etc.) in order for the transformation engine to perform the transformation.

In some embodiments, instead of obtaining a transformation template from an external device, the template generation module 210 of the transformation tool 220 may autonomously generate a transformation template. For example, when a new version of an application framework is released, the new version is usually accompanied with an upgrade specification (e.g., release notes) that specifies (in natural languages) the differences between the new version and the previous version of the application framework. As such, the template generation module 210 of the transformation tool 220 in some embodiments may parse and interpret the upgrade specification (e.g., using a natural language parser) to extract a list of differences between the two versions, and automatically generate the transformation template based on the extracted list of differences. The transformation tool 220 may store the transformation templates (obtained from the external device 206 and/or generated itself) in the template repository 202. The transformation templates stored in the template repository 202 are available for selection by the transformation engine 105 to transform applications.

Figure 3:
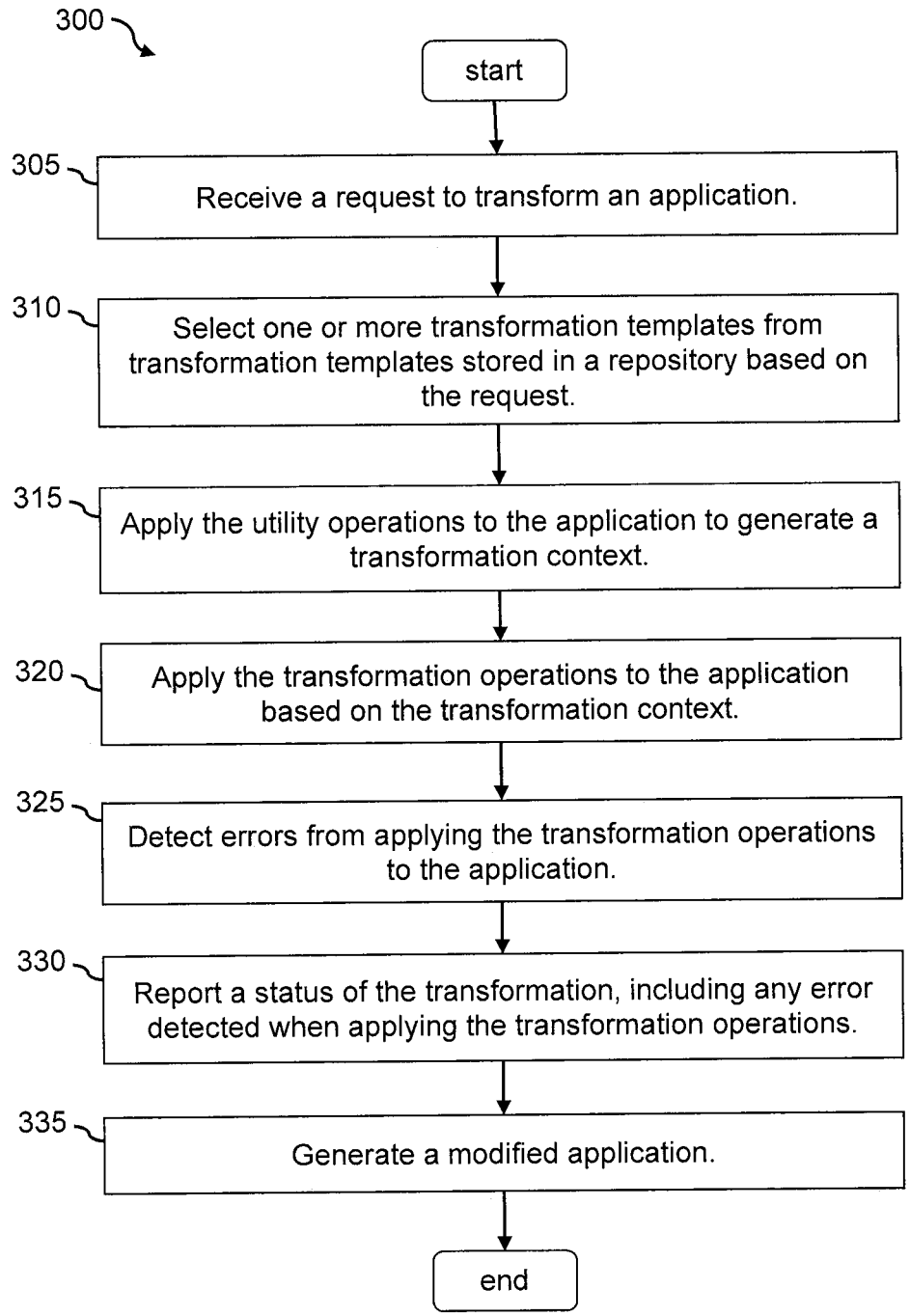
FIG. 3 is a flowchart showing a process of using an application transformation platform to transform an application according to an embodiment of the present disclosure.

FIG. 3 illustrates a process 300 for transforming applications according to various embodiments of the disclosure. In some embodiments, the process 300 may be performed by the application transformation tool 220. As discussed above, the application transformation tool 220 may be configured to facilitate transformations of various applications according to one or more transformation templates. The process 300 begins by receiving (at step 305) a request to transform an application. For example, the transformation tool 220 may receive the request from the computing device 204 via the user interface 208. In some embodiments, the request may specify a set of transformation criteria and may provide the application (e.g., the application 115a) (or a pointer, such as an address, pointing to a memory location where the application is stored) to be transformed. As discussed above, the application 115a may include a data structure (e.g., a file structure comprising folders and files) that stores and organizes different data objects (e.g., data files) related to the application. The data objects may include objects that store source codes that may be compiled and executed to perform functionalities of the application. The data objects may also include configuration files that indicate to the application 115a (or the compiler/execution program that executes the application) information (e.g., dependency information) of the application 115a. The dependency information may specify, for example, which other application(s), data storage, and/or network on which the application 115a depends during execution.

The transformation tool 220 may then extract the set of transformation criteria from the request, and determines the type of transformation based on the extracted set of transformation criteria. In one example, the set of transformation criteria indicated in the request may specify an upgrade from Version 1.0 of an application framework to Version 2.0 of the application framework. In some embodiments, the transformation tool 220 may allow the request to specify a target application framework without specifying an application framework (or a version) that the application 115a is currently compatible with. In these embodiments, the transformation tool 220 may first analyze the application 115a (e.g., parsing the source codes and the configuration file associated with the application 115a) to determine which application framework (and which version) in which the application 115a is intended to be executed. The transformation engine 105 may then determine the type of transformation necessary to bring the application 115a to be compatible with the target application framework based on the analysis.

Next, the process 300 selects (at step 310) one or more transformation templates for transforming the application based on the request. For example, the transformation engine 105 may select one or more transformation templates from the template repository 202 for the request.

In some embodiments, the transformation engine 105 may first search through the transformation templates stored in the template repository 202 to determine if a single template that matches the type of transformation indicated in the request exists. If a single template that matches the type of transformation indicated in the request exists, the transformation engine 105 selects that single template for transforming the application 115a.

However, if the transformation engine 105 cannot locate a single template that matches the type of transformation indicated in the request, the transformation engine 105 may determine if two or more transformation templates, in combination, satisfy the set of transformation criteria indicated in the request. For example, the transformation engine 105 may analyze an upgrade path of the application framework, and determine if the upgrade path includes one or more intermediate versions between the versions specify in the request (Version 1.0 and Version 2.0). If it is determined that the upgrade path of the application framework includes at least one intermediate version (e.g., Version 1.2), the transformation engine 105 searches the template repository 202 to determine if templates associated with the completed upgrade path of the application framework (e.g., the upgrade path from Version 1.0 to Version 2.0) exist. For example, the template repository 202 may include a transformation template 110a associated with upgrading from Version 1.0 of the application framework to Version 1.2 of the application framework and a transformation template 110b associated with upgrading from Version 1.2 of the application framework to Version 2.0 of the application framework. Thus, the transformation engine 105 may select transformation templates 110a and 110b for the request. It is noted that when there is more than one intermediate version along the upgrade path, more than two templates may be selected by the transformation engine 105 for the request.

Multiple transformation templates may also be selected for transformation associated with migrating from one application framework to another application framework in a similar manner. For example, if the set of transformation criteria indicated in the request specifies migrating from Application Framework 'A' to Application Framework 'B,' and no single template exists in the repository 202 that is associated with such a migration, the transformation engine 105 may determine if multiple templates from the repository 220 satisfy such transformation criteria. In some embodiments, the transformation engine 105 search the repository 220 to determine if multiple templates form a migration path for the request. For example, the template repository 202 may include a transformation template 110c associated with migrating from Application Framework 'A' to Application Framework 'C,' and another transformation template 110d associated with migrating from Application Framework 'C' to Application Framework 'D.' As such, the transformation engine 105 may select the transformation templates 110c and 110d for the request. Note that templates may also be found outside repository 220, such as separate repositories or databases accessible by the transformation engine 105, including public repositories. In one embodiment, the transformation engine 105 will only search for templates outside of repository 220 if a suitable template is not found in the repository 220.

At step 315, the process 300 applies one or more transformation utilities in the selected template(s) to generate a transformation context for the application. In some embodiments, the transformation engine 105 may apply the one or more transformation utilities on the application. As discussed above, unlike the transformation operations, the transformation utilities do not modify the application, but may instead generate information (e.g., metadata) about the application, such as the number of folders and files and the file structure of the application, locations of different files, etc. Once the transformation context is generated, the context is accessible by the transformation engine 105 when the transformation engine 105 performs the transformation operations.

The transformation engine 105 may then identify the transformation operations defined in the selected transformation templates. As discussed above, each transformation template may define a set of transformation operations that can be performed on an application. Example transformation operations may include adding and/or removing one or more folders in the data structure of the application, changing a name of a folder in the data structure, modifying the configuration file (e.g., adding or removing a dependency, etc.) of the application, modifying one or more source code files (e.g., changing a function call name, changing the parameters in one or more function calls, etc.) of the application, and/or any other types of operations for modifying the application. In addition to the transformation operations, the selected transformation template(s) may also include test operations associated with the transformation operations. A test operation, when executed on the application, may detect whether the associated transformation utility(s) or transformation operation(s) is successfully performed on the application. A transformation template may include multiple test operations, where each test operation may be associated with one or more transformation utilities or transformation operations. In some embodiments, the test operation may be embedded within the associated transformation operation(s). As such, the transformation engine may identify the transformation operations individually and/or in groups based on the test operations.

The process 300 then applies (at step 320) the transformation operations defined in the selected transformation template(s) to the application to generate a modified application. It is noted that the transformation utilities may be intermingled with the transformation operations such that one or more transformation utilities may be performed between transformation operations, as will be illustrated below by reference to FIG. 4. The transformation engine 105 may perform (e.g., compile and execute) the transformation operations defined in the selected transformation template(s) on the application 115a based on the generated context. For example, the transformation engine 105 may perform a transformation operation (e.g., adding a code to the configuration file of the application) based on a specific context (e.g., the file location of the configuration file). In some embodiments, the transformation engine 105 may perform different transformation operations based on a specific context of the application. For example, the transformation engine 105 may be configured (based on the template) to perform a first subset of transformation operations when the context indicates a first condition (e.g., an existence of a specific file in the file structure of the application) and to perform a second subset of transformation operations when the context indicates a second condition (e.g., the specific file does not exist in the file structure of the application). In some embodiments, the transformation engine 105 may also perform different transformation operations based on the performance status of a transformation utility. For example, the transformation engine 105 may be configured (based on the template) to perform a transformation operation only when a specific transformation utility is performed successfully.

When multiple transformation templates (e.g., transformation templates 110a and 110b) are selected, the transformation engine 105 may order the transformation templates 110a and 110b in the order of the progression of the upgrade/migration path. In the above example where the upgrade path includes upgrading from Version 1.0 to Version 1.2 and upgrading from Version 1.2 to Version 2.0, the transformation engine 105 may put the transformation template 110a associated with upgrading from Version 1.0 to Version 1.2 ahead of the transformation template 110b associated with upgrading from Version 1.2 to Version 2.0. The transformation engine 105 may then apply the transformation operations of the templates in the determined order—that is, performing the transformation operations defined in the transformation template 110a first and then performing the transformation operations defined in the transformation template 110b.

As the transformation engine 105 performs (e.g., executes) each of the transformation utilities and transformation operations defined in the selected transformation template(s), the transformation validation module 216 of the transformation engine 105 may detect (at step 325) whether there is any error (or there are sufficient errors to cause the transformation to fail or exceed an error threshold, which can be defined by the application or based on application functionality and requirements) associated with performing the transformation utilities and transformation operations. For example, the transformation validation module 216 may perform (execute) the test operation associated with the operation to determine whether the transformation utility or transformation operation has been successfully performed on the application (e.g., modifying the application). In some embodiments, the test operation may provide to the transformation validation module 216 a success indication when the associated transformation operation is successfully performed on the application. In some embodiments, the test operation may also provide to the transformation validation module 216 an error code indicating a type of error (e.g., read file error, write file error, access denied, etc.) when the associated transformation operation is not successfully performed. In some embodiments, when any one of the operations is not successfully performed, the transformation validation module 216 may present any error(s) detected when performing the transformation to the user via the user interface 208.

When all of the transformation operations associated with the selected transformation template(s) are performed, the transformation validation module 216 may report (at step 330) a status of the transformation (including any errors detected for each operation), and the transformation engine 105 may generate (at step 335) the modified application 115b. The status of the transformation may include any success/failure of applying the transformation operations to the application 115a. The transformation engine 105 may also provide the modified application to the user via the user interface 208. In some embodiments, the transformation engine 105 generates the modified application 115b by modifying (e.g., transforming) the source codes associated with the application. The transformation engine 105 may also modify the configuration file associated with the application 115a and/or modify the data structure associated with the application 115a.

Figure 4:
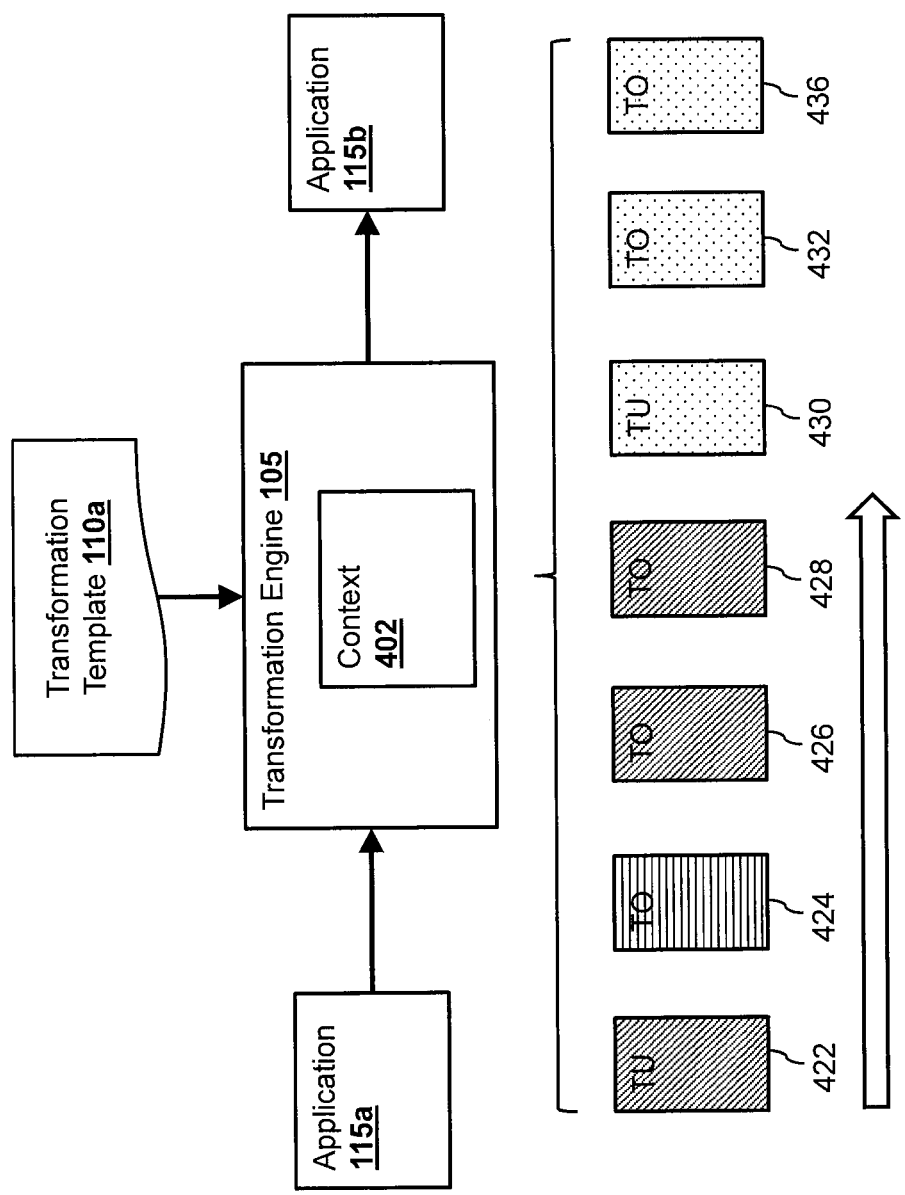
FIG. 4 illustrates performing individual transformation operations associated with a transformation template according to an embodiment of the present disclosure.

FIG. 4 illustrates a transformation of the application 115a by the transformation engine 105 according to various embodiments of the disclosure. In this example, the transformation engine 105 transforms the application 115a by applying the transformation template 110a. As shown, the transformation engine 105 has identified, from the transformation template 110a, operations 422-436, for example, by parsing and analyzing the transformation template 110a. The operations 422-436 may include transformation utilities, such as transformation utilities 422 and 430 (labeled as 'TU') and transformation operations, such as transformation operations 424, 426, 428, 432, and 436 (labeled as 'TO'). For example, the transformation utility 422 may include an operation to determine the location of the configuration file associated with the application 115a. The information generated by the transformation utilities (e.g., the transformation utility 422) may be used to generate a context 402 for the application 115a. The context 402 is stored and accessible by the transformation engine 105 when performing the transformation operations. In this example, the transformation operation 424 may include an operation to modify the configuration file based on the determined location. As such, the transformation engine 105 may use the information from the context 402 to locate the configuration file in the application 115a, and applies the transformation operation 424 to the configuration file. As discussed above, one or more transformation utilities (e.g., the transformation utility 430) may be intermingled among transformation operations. Thus, the context 402 once generated may be continuously updated based on new information generated by subsequent transformation utility(s).

In some embodiments, each of the operations 422-436 may be associated with a test operation (e.g., embedded in the operation). As such, as the transformation engine 105 performs (e.g., executes) each of the operations 422-436, the transformation validation module 216 may detect (based on the indication and/or the error code provided by the respective test operations) whether the operations 422-436 are successfully performed. In this example, the transformation validation module 216 may detect that operations 422, 426, and 428 have been performed successfully on the application 115a, as indicated by the diagonal line pattern of the boxes 422, 426, and 428. In addition, the transformation validation module 216 may detect that the transformation operation 424 has failed, with possibly one or more errors, as indicated by the horizontal line pattern in the box 424. The transformation operations 430-436 have not yet been performed (e.g., executed) by the transformation engine 105, as indicated by the dot pattern in the boxes 430-436. In some embodiments, the transformation engine 105 may present to the user via the user interface 208 information related to the status of each of the transformation operations, either when the transformation is completed and/or during the transformation. In some of these embodiments, the information may be presented in a graphical manner similar to the boxes 422-436 illustrated in FIG. 4.

Figure 5:
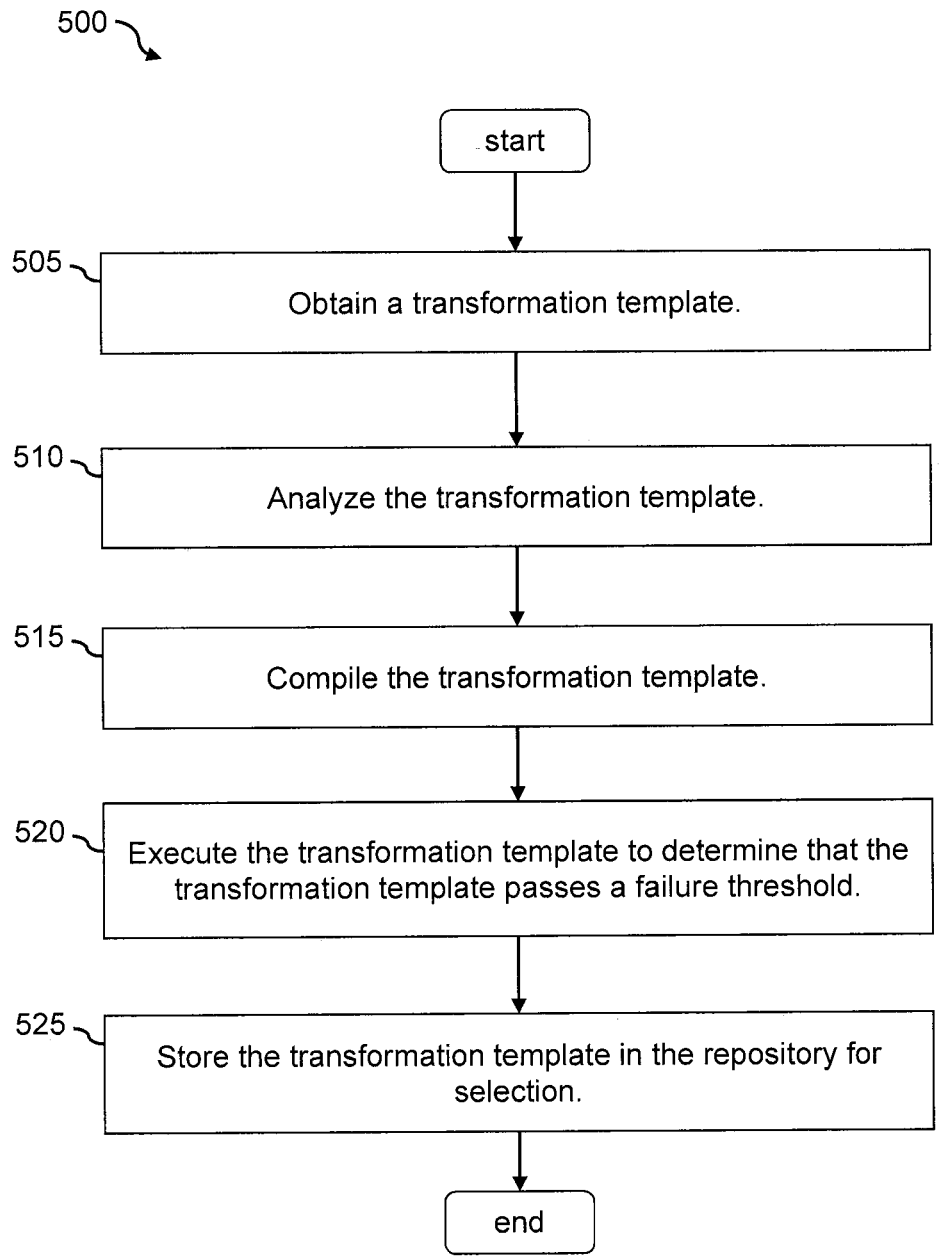
FIG. 5 is a flowchart showing a process of validating a transformation template according to an embodiment of the present disclosure.

Failures in performing a transformation operation may be caused by a computer mal-function, pre-existing errors in the codes associated with the application, and/or errors in the transformation template. In order to reduce the amount of failures when performing the transformation to applications, in some embodiments, when the transformation engine 105 obtains a new transformation template (e.g., receiving from the computing device 206 via the user interface 208 or generating by itself, etc.), the transformation engine 105 may use the template validation module 212 to validate the new transformation template and store the new transformation template in the template repository 202 only after the new transformation template is validated. FIG. 5 illustrates a process 500 for validating a transformation template according to various embodiments of the disclosure. In some embodiments, the process 500 may be performed by the transformation tool 220.

The process 500 begins by obtaining (at step 505) a transformation template. As discussed above, the transformation template may be obtained in different ways. In some embodiments, the transformation template may be received from one of the external devices (e.g., the computing device 206). The transformation template may be generated by a human software developer. For example, when it is desired that one or more applications (e.g., applications 115a, 120a, and 125a) be transformed according to a particular type of transformation (e.g., migrated/upgraded from a first application framework to a second application framework), the human software developer may generate a transformation template specifically for the particular type of transformation and provide to the transformation tool 220 using the API and/or the user interface 208 of the transformation tool 220. In some other embodiments, the transformation template may be generated by the template generation module 210 based on an upgrade specification (e.g., release notes) specifying differences between two application frameworks or two versions of the application framework.

The process 500 then analyzes (at step 510) the transformation template. For example, the template validation module 212 may parse and analyze the transformation template to determine whether the syntax of the transformation template is compatible with the syntax rules associated with transformation templates. Thus, the template validation module 212 may detect whether the transformation template includes any syntax errors. If any syntax error is detected by the template validation module 212, the template validation module 212 may invalidate the transformation template. If the transformation template was received from a device (e.g., the computing device 206), the template validation module 212 may transmit an indication indicating the invalidation of the transformation template and the detected errors. However, if no syntax error is detected, the process 500 compiles (at step 515) the transformation template and executes (at step 520) the transformation template to determine whether the transformation template includes any logical error. For example, the template validation module 212 may compile the transformation template and may execute the transformation template. The transformation template is associated with (corresponding to) a transformation for transforming from an original application framework to a destination application framework. In some embodiments, based on the type of transformation associated with the transformation template, the template validation module 212 may execute the transformation template on a sample application that is compatible with the original application template. As discussed above, the transformation template also includes test operations in addition to transformation operations. As such, the template validation module 212 may also execute the test operations in the template to determine whether any the test operations return any errors. If one or more errors are returned from the test operations, the template validation module 212 may invalidate the transformation template. If the transformation template was received from a device (e.g., the computing device 206), the template validation module 212 may transmit an indication indicating the invalidation of the transformation template and the detected errors. However, if no error is returned from the test operations, the template validation module 212 may determine that the transformation template passes a failure threshold.

The process 500 then stores (at step 525) the transformation template in a repository. For example, once the template validation module 212 determines that the transformation template passes the failure threshold, the template validation module 212 may store the transformation template in the template repository 202. The transformation template, along with other validated transformation template stored in the template repository 202, are then available for the transformation engine 105 to select for performing transformations on applications.

As discussed above, the transformation engine 105 may in certain situations select multiple transformation templates to be applied to an application. For example, when the request specifies a transformation to an application that is associated with upgrading from Version 1.0 of an application framework to Version 2.0 of the application framework and no transformation template associated with upgrading from Version 1.0 of the application framework to Version 2.0 of the application framework exists in the template repository, the transformation engine may search in the repository for at least a first transformation template that is associated with upgrading from Version 1.0 of the application framework to an intermediate version (e.g., Version 1.2) of the application framework and a second transformation template that is associated with upgrading from an intermediate version (e.g., Version 1.2 or higher) of the application framework to Version 2.0 of the application framework, and select at least the first and second transformation templates to be applied to the application.

In another example, if the set of transformation criteria indicated in the request specifies migrating from Application Framework 'A' to Application Framework 'B,' and no single template exists in the repository 202 that is associated with such a migration, the transformation engine 105 may determine if multiple templates from the repository 220 satisfy such transformation criteria. In some embodiments, the transformation engine 105 search the repository 220 to determine if multiple templates form a migration path for the request. For example, the template repository 202 may include a transformation template 110c associated with migrating from Application Framework 'A' to Application Framework 'C,' and another transformation template 110d associated with migrating from Application Framework 'C' to Application Framework 'D.' As such, the transformation engine 105 may select the transformation templates 110e and 110d for the request.

Figure 6:
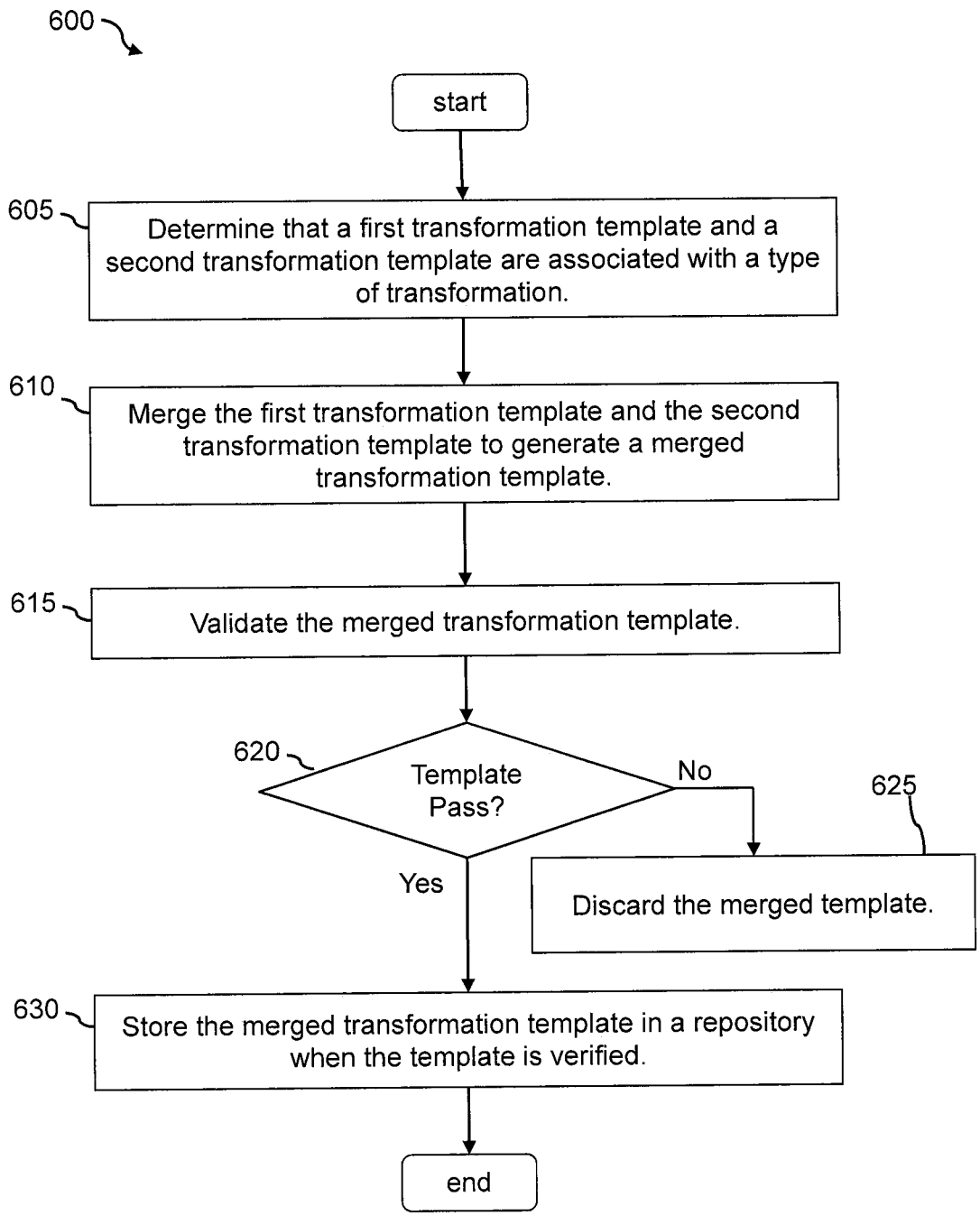
FIG. 6 is a flowchart showing a process of merging transformation templates according to an embodiment of the present disclosure.

In some embodiments, instead of applying the selected multiple transformation templates to the application, the transformation tool 220 may merge the selected transformation templates to generate a merged transformation template before applying the merged transformation template to the application. FIG. 6 illustrates a process 600 for merging multiple transformation templates according to various embodiments of the disclosure. In some embodiments, the process 600 may be performed by the transformation tool 220. Further, in some embodiments, the process 600 may be part of the process 300, and may be performed between step 310 and step 315 of the process 300.

Merging the multiple transformation templates may provide additional improvement to the efficiency and the speed of the transformation by, for example, simplifying and/or eliminating at least some of the transformation operations. For example, the transformation engine may combine a transformation operation from a first template with a transformation operation from a second template to generate a single merged operation. In another example, the transformation engine may determine that a transformation of the first template becomes unnecessary in view of one or more operations in the second template, and thus remove the operation of the first template in the merged template. Another benefit of merging the transformation templates is that the merged transformation template may then be stored in the repository 202 and made available to the transformation engine 105 for any subsequent requests, which enhances the speed of selecting the appropriate template(s) for the subsequent requests.

The process 600 begins by determining (at step 605) that a first transformation template and a second transformation template are associated with a type of transformation. For example, after the transformation engine 105 selects multiple transformation templates (e.g., transformation template 110a and transformation template 110b) based on a request, the template merging module 214 may determine that the combination of the selected transformation templates (e.g., the transformation templates 110a and 110b) is associated with a type of transformation (e.g., upgrading from Version 1.0 to Version 2.0 of the application framework). In this example, the transformation template 110a is associated with upgrading from Version 1.0 to Version 1.2 of the application framework, and the transformation template 110b is associated with upgrading from Version 1.2 to Version 2.0 of the application framework.

The process 600 then merges (at step 610) the first transformation template and the second transformation template to generate a merged transformation template. For example, the template merging module 214 may combine the transformation operations in the transformation template 110a with the transformation operations in the transformation template 110b. In some embodiments, when combining the transformation operations, the template merging module 214 places the transformation operations in the order of the progression of the transformation (the upgrade path). For example, since the upgrade from Version 1.0 to Version 1.2 comes before the upgrade from Version 1.2 to Version 2.0, the template merging module 214 may put the transformation operations of the transformation template 110a before the transformation operations of the transformation template 110b.

In some embodiments, the template merging module 214 may analyze the combined transformation operations to determine whether any transformation operations can be combined and/or eliminated. For example, duplicate transformation utilities (e.g., opening the same file, closing the same file, etc.) may be eliminated by the template merging module 214.

In another example, when the template merging module 214 determines that two separate transformation operations effectively cancel each other out or results in a null operation (e.g., a first operation adds a file and a second subsequent operation deletes the file, etc.), the two operations may be eliminated by the template merging module 214. In yet another example, when the template merging module 214 determines that two separate transformation operations modify the same section of the file (e.g., modifies the name of the same function call, modifies the parameters of the same function call, etc.), the template merging module 214 may combine the two operations into a single transformation operation.

After merging the transformation templates, the process 600 validates (at step 615) the merged transformation template. For example, the transformation tool 220 may use the template validation module 212 to validate the merged transformation template by performing the process 500 as discussed above. The process then determines (at step 620) whether the merged transformation template is validated. When the merged transformation template is not validated, the process 600 discards (at step 625) the merged template.

When the merged transformation template is validated (e.g., by using the process 500), the process 600 stores (at step 630) the merged transformation template. For example, the template merging module 214, once received a validation indication from the template validation module 212, may store the merged transformation template in the template repository 202, such that the merged transformation template can be made available to the transformation engine 105 to use in transforming applications. In some embodiments, the transformation engine 105 applies the merged transformation template on an application (e.g., the application 115a).

As such, the application transformation tool of various embodiments discussed above enables applications to be transformed in an efficient and consistent manner. Human software developers who are responsible to develop and maintain the various applications associated with an organization no longer need to individually modify applications when the need arises (e.g., when the applications are required to migrate from one application framework to another application framework, when the applications are required to upgrade to a newer version of the application framework, etc.). Instead, using the application transformation tool according to various embodiments of the disclosure, one or more transformation templates can be applied to all of the applications to facilitate the transformation, which reduces human resources and potential errors (e.g., made by human developers when the applications are modified manually and separately by different human developers, etc.).

Figure 7:
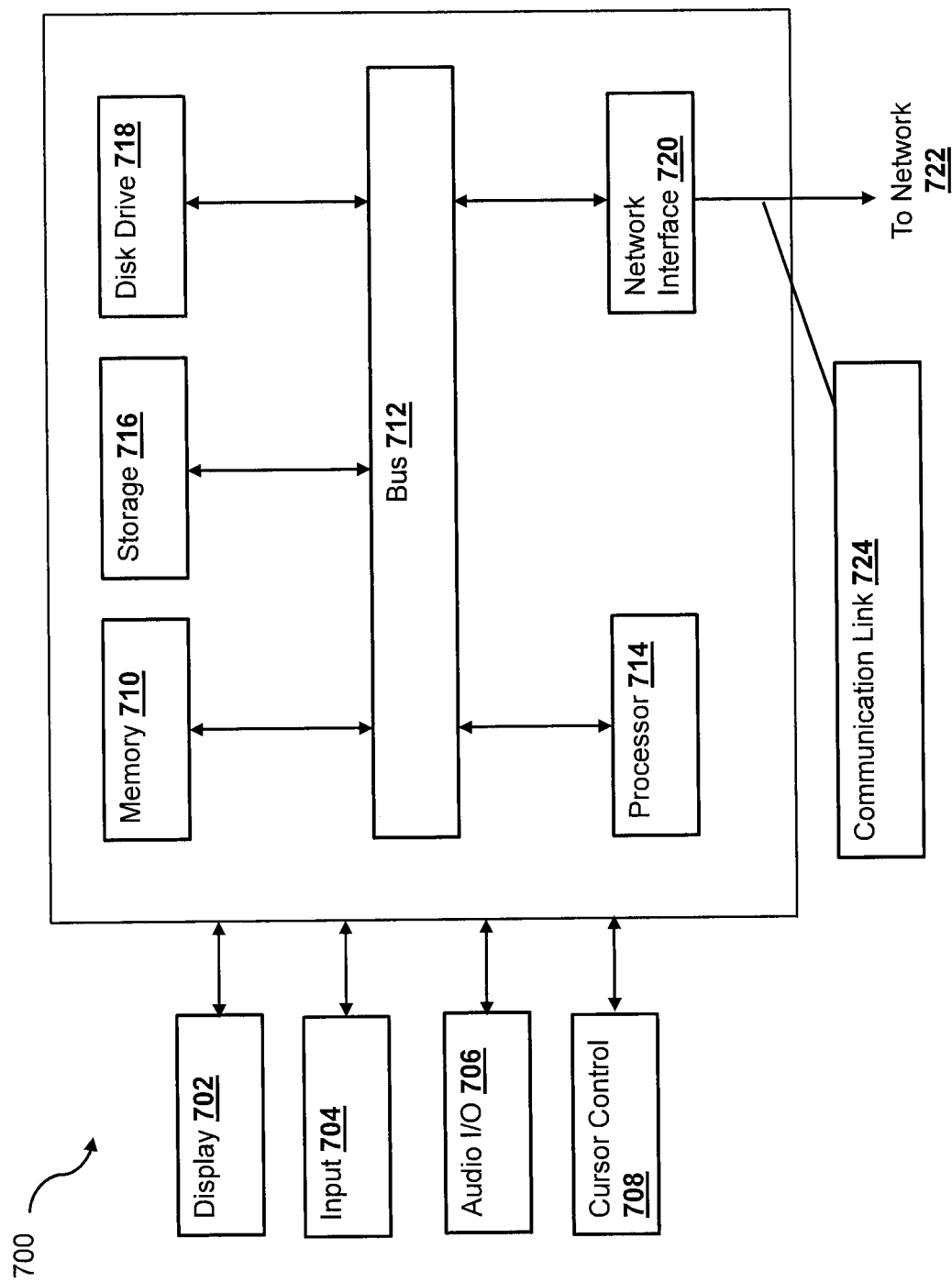
FIG. 7 is a block diagram of a system for implementing a device according to an embodiment of the present disclosure.

FIG. 7 is a block diagram of a computer system 700 suitable for implementing one or more embodiments of the present disclosure, including the transformation engine 105, the template repository 202, the computing device 204, and the computing device 206. In various implementations, each of the computing devices 204 and 206 may include a mobile cellular phone, personal computer (PC), laptop, wearable computing device, etc. adapted for wireless communication, and each of the transformation engine 105 and the template repository 202 may include a network computing device, such as a server. Thus, it should be appreciated that each of the transformation engine 105, the template repository 202, the computing device 204, and the computing device 206 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the risk analysis functionalities described herein according to the processes 300, 500, and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

APPENDIX A

```
package com.extensiontest;
import com.paypal.butterfly.extensions.api.Extension;
import com.paypal.butterfly.extensions.api.TransformationTemplate;
import com.paypal.butterfly.extensions.api.utilities.Abort;
import com.paypal.butterfly.utilities.conditions.FileExists;
import com.paypal.butterfly.utilities.operations.file.ApplyFile;
import com.paypal.butterfly.utilities.operations.file.DeleteFile;
import com.paypal.butterfly.utilities.operations.pom.*;
import com.paypal.butterfly.utilities.operations.text.InsertText;
import com.paypal.butterfly.utilities.operations.text.ReplaceText;
import java.net.URL;
/**
 * Sample transformation template to migrate the sample-app
 * from a WAR deployment application model to a Spring Boot
 * application model
 *
 * @author facarvalho
 */
public class SampleTransformationTemplate extends TransformationTemplate {
    public SampleTransformationTemplate( ) {
        // checking first it the app has a root pom.xml file,
        // and aborting if not
        final String pomFileExists = add(new FileExists( ).relative("pom.xml"));
        add(new Abort("This application does not have a root pom.xml file").executeUnless(pomFileExists));
        // Misc changes in pom.xml
        add(new PomChangePackaging("jar").relative("pom.xml"));
        add(new PomAddParent("org.springframework.boot", "spring-boot-starter-parent", "1.5.6.RELEASE").relative("pom.xml"));
        add(new PomAddPlugin("org.springframework.boot", "spring-boot-maven-plugin").relative("pom.xml"));
        add(new PomRemoveProperty("spring.version").relative("pom.xml"));
        // Removing unnecessary dependencies in pom.xml
        add(new PomRemoveDependency("org.springframework", "spring-context").relative("pom.xml"));
        add(new PomRemoveDependency("org.springframework", "spring-web").relative("pom.xml"));
        add(new PomRemoveDependency("org.jboss.resteasy", "resteasy-servlet-initializer").relative("pom.xml"));
        add(new PomRemoveDependency("org.jboss.resteasy", "resteasy-jackson2-provider").relative("pom.xml"));
        add(new PomRemoveDependency("org.jboss.resteasy", "resteasy-spring").relative("pom.xml"));
        // Adding Spring Boot starter dependencies in pom.xml
        add(new PomAddDependency("org.springframework.boot", "spring-boot-starter-web").relative("pom.xml"));
        add(new PomAddDependency("com.paypal.springboot", "resteasy-spring-boot-starter", "2.3.3-RELEASE", "runtime").relative("pom.xml"));
        // Removing webapp folder
        add(new DeleteFile( ).relative("/src/main/webapp"));
        // Adding Spring Boot entry point class
        URL javaFileUrl = this.getClass( ).getResource("/Application.java");
        add(new ApplyFile(javaFileUrl).relative("/src/main/java/com/sample/app"));
        // Changing README.md
        add(new ReplaceText("(Spring framework)", "Spring Boot framework").relative("README.md"));
        add(new ReplaceText("(Just deploy its war file to a Servlet container and start it.)", "There are two ways to start the application:").relative("README.md"));
        URL textToBeInserted = getClass( ).getResource("/README_piece_of_text.txt");
        add(new InsertText(textToBeInserted, "(There are two ways to start the application:)").relative("README.md"));
    }
  @Override
  public Class>? extends Extension> getExtensionClass( ) {
        return SampleExtension.class;
  }
  @Override
  public String getDescription( ) {
        return "Sample transformation template";
  }
}
```

What is claimed is:

1. A method comprising:
   receiving, by one or more hardware processors via an application programming interface from a user, a request for transforming an application from operating in a first operating environment to operating in a second operating environment, wherein the application comprises a file structure specifying an organization of a plurality of files and programming code corresponding to the first operating environment;
   determining, by the one or more hardware processors, the request is not satisfiable by any single transformation template from a plurality of stored transformation templates, wherein each transformation template in the plurality of stored transformation templates corresponds to transforming the application from operating in one operating environment to operating in a different operating environment;
   in response to determining that the request is not satisfiable by any single transformation template, determining, by the one or more hardware processors, a transformation path for transforming the application from operating in the first operating environment to operating in the second operating environment based on transformation data corresponding to the plurality of stored transformation templates;
   selecting, by the one or more hardware processors from the plurality of stored transformation templates; a subset of transformation templates for the request based on the transformation path;
   generating, by the one or more hardware processors, a transformation context for the application, wherein the transformation context represents file locations of the plurality of files within the file structure;
   defining, by the one or more hardware processors, a set of transformation operations based on the subset of transformation templates and the transformation context generated for the application, wherein the set of transformation operations comprises at least an operation for changing a file location of a particular file within the file structure and an operation for modifying the programming code of the application; and
   selectively applying, by the one or more hardware processors, the set of transformation operations to the application to generate a transformed application.

2. The method of claim 1, wherein the request is for transforming the application from operating in a first application framework to operating in a second application framework.

3. The method of claim 1, wherein the request is for transforming the application from operating in a first version of an application framework to operating in a second version of the application framework.

4. The method of claim 1, further comprising:
   merging the subset of transformation templates to generate a merged transformation template, wherein the set of transformation operations is defined further based on the merged transformation template.

5. The method of claim 1, wherein a first transformation template from the subset of transformation template comprises a first transformation operation, wherein a second transformation template from the subset of transformation template comprises a second transformation operation, and wherein the method further comprises:
   determining that the first and second transformation operations are associated with transforming a common section of the file structure; and
   in response to determining that the first and second transformation operations are associated with transforming a common section of the file structure, combining the first and second transformation operations into a third transformation operation.

6. The method of claim 1, wherein a first transformation template from the subset of transformation templates comprises a first transformation operation, wherein a second transformation template from the subset of transformation templates comprises a second transformation operation, and wherein the method further comprises:
   determining that performing the first and second transformation operations negate each other; and
   in response to the determining that performing the first and second transformation operations negate each other, eliminating the first and second transformation operations.

7. The method of claim 1, wherein a first transformation template from the subset of transformation templates comprises a first transformation operation, wherein a second transformation template from the subset of transformation templates comprises a second transformation operation, and wherein the method further comprises:
   determining that the first and second transformation operations are redundant; and
   in response to the determining that the first and second transformation operations are redundant, eliminating one of the first and second transformation operations.

8. The method of claim 1, wherein the transformation path comprises an intermediate operating environment, and wherein the subset of transformation templates comprises at least one of a first transformation template corresponding to transforming the application from operating in the first operating environment to the intermediate operating environment or a second transformation template corresponding to transforming the application from operating in the intermediate operating environment to operating in to the second operating environment.

9. The method of claim 1, wherein the generating the transformation context comprises traversing the file structure of the application.

10. A system comprising:
    a non-transitory memory; and
    one or more hardware processors coupled with the non-transitory memory and configured to read instructions from the non-transitory memory to cause the system to perform operations comprising:
       receiving, via an application programming interface from a user, a request for transforming an application from operating in a first operating environment to operating in a second operating environment, wherein the application comprises a file structure specifying an organization of a plurality of files and first source codes corresponding to the first operating environment;
       obtaining a plurality of transformation templates, wherein each transformation template in the plurality of transformation templates defines a set of transformation operations corresponding to transforming the application from operating in one operating environment to operating in a different operating environment;
       determining the request is not satisfiable by any single transformation template from the plurality of transformation templates;
       in response to determining that the request is not satisfiable by any single transformation template, determining a transformation path for transforming the application from operating in the first operating environment to operating in the second operating environment based on transformation data corresponding to the plurality of transformation templates;

selecting, from the plurality of transformation templates, a set of transformation templates for the request based on the transformation path; and applying a plurality of transformation operations associated with the set of transformation templates to the application to generate a transformed application, wherein the plurality of transformation operations comprises at least one of an operation for changing a file location of a particular file within the file structure or an operation for modifying the first source codes to generate second source codes.

11. The system of claim 10, wherein the plurality of transformation templates is stored in a template repository for selection, wherein the operations further comprise:

obtaining a transformation template that is not stored in the template repository;

determining that the transformation template passes a failure threshold; and in response to determining that the transformation template passes the failure threshold, inserting the transformation template in the template repository.

12. The system of claim 11, wherein determining that the transformation template passes the failure threshold comprises:

compiling the transformation template; and executing the compiled transformation template according to a set of template test operations to determine that the transformation template passes the error threshold.

13. The system of claim 11, wherein the operations further comprise:

receiving an indication indicating a release of a first version of an application framework that is an upgrade from a second version of the application framework;

in response to receiving the indication, automatically generating the transformation template; and associating the transformation template with upgrading from the second version to the first version of the application framework.

14. The system of claim 13, wherein the transformation template is generated based on an upgrade specification defining differences between the first version and the second version of the application framework.

15. The system of claim 10, wherein applying the plurality of transformation operations to the application comprises:

applying a first transformation operation from the plurality of transformation operations to the application to generate a modification to at least a portion of the first source codes;

detecting that the modification to the portion of the first source codes introduces an error;

associating the error to the first transformation operation; and reporting the error in association with the first transformation operation to the user.

16. The system of claim 10, wherein at least one transformation operation in the plurality of transformation operations comprises a modification to a function call in the first source codes.

17. The system of claim 10, wherein at least one transformation operation in the plurality of transformation operations comprises adding a dependency to the application, wherein the dependency comprises at least one of a dependency to a second application, a dependency to a database, or a dependency to a network.

18. The system of claim 10, wherein at least one transformation operation in the plurality of transformation operations comprises removing a dependency from the application.

19. A non-transitory machine readable medium having stored thereon machine-readable instructions executable to cause a machine to perform operations comprising:

obtaining a plurality of transformation templates, wherein each transformation template in the plurality of transformation templates defines a set of transformation operations corresponding to transforming an application from operating in one operating environment to operating in a different operating environment;

receiving, via an application programming interface from a user, a request for transforming the application from operating in a first operating environment to operating in a second operating environment, wherein the application comprises a file structure specifying an organization of a plurality of files and first source codes corresponding to the first operating environment;

determining the request is not satisfiable by any single transformation template from the plurality of transformation templates;

in response to determining that the request is not satisfiable by any single transformation template, determining a transformation path for transforming the application from operating in the first operating environment to operating in the second operating environment based on transformation data corresponding to the plurality of transformation templates;

selecting, from the plurality of transformation templates, a set of transformation templates for the request based on the transformation path; and applying transformation operations associated with the set of transformation templates to the application wherein the transformation operations comprise at least one of an operation for changing a file location of a particular file within the file structure or an operation for modifying the first source codes to generate second source codes.

20. The non-transitory machine readable medium of claim 19, wherein the set of transformation templates comprises a first transformation template and a second transformation template, and wherein the operations further comprise:

merging the first and second transformation templates to generate a merged transformation template; and applying the merged transformation template to the application.

* * * * *

UNITED STATES PATENT AND TRADEMARK OFFICE
CERTIFICATE OF CORRECTION

PATENT NO. : 10,656,922 B2
APPLICATION NO. : 15/990158
DATED : May 19, 2020
INVENTOR(S) : Carvalho et al.

Page 1 of 1

It is certified that error appears in the above-identified patent and that said Letters Patent is hereby corrected as shown below:

In the Claims

Column 21, Line 28, please correct as follows:
the plurality of stored transformation templates, a sub- Column 22, Line 37, please correct as follows:
mediate operating environment to operating in the second Column 24, Line 46, please correct as follows:
of transformation templates to the application, wherein Signed and Sealed this
Twenty-seventh Day of October, 2020

Andrei Iancu
*Director of the United States Patent and Trademark Office*